Patented June 4, 1929.

1,715,877

UNITED STATES PATENT OFFICE.

JOHN T. TRAVERS, OF COLUMBUS, OHIO, ASSIGNOR, BY DIRECT AND MESNE ASSIGNMENTS, TO THE TRAVERS PROCESS CORPORATION, OF COLUMBUS, OHIO, A CORPORATION OF OHIO.

PROCESS FOR PURIFYING POLLUTED LIQUIDS AND INDUSTRIAL WASTE.

No Drawing. Application filed October 17, 1927. Serial No. 226,823.

This invention relates to a process for treating polluted liquids containing putrescible organic matter. The process is predicated upon the proposition that the putrescible matter present in organic wastes is largely in colloidal form. The biochemical oxygen demand of the sewage or waste is due principally to the colloids. Furthermore I have found that the bacteria present in the sewage are colloids. As a specific example, I have found that 80% of faecal matter vigorously shaken with water is colloidal and that about 85% of the entire oxygen demand of the solution is due to the colloidal fraction. Since the putrescible matter is present in organic wastes in colloidal form, it may be effectively separated from the waste when the same has an alkaline reaction and the colloids carry a negative charge, by incorporating in the organic waste an electrolyte producing material, characterized by its ability to dissociate into positive and negative ions, the reaction being that the positive ions, separated from the electrolyte producing material, are adsorbed by the negative colloids, destroying their stability and transferring their condition from one of dispersion to one of suspension, permitting them to be readily carried down by any suitable coagulant. Several electrolyte producing materials have been found suitable for use in processes for the purification of organic wastes. This process relates specifically to the employment as an electrolyte producing material, of a treating mixture, the major portion of which represents a waste product in the form of precipitated sludge derived from the treatment of waste acid liquors discharged from the pickling vats of steel mills, with a reagent composed principally of an electrolyte producing material and calcium hydroxide.

I have found that the sludge precipitated from waste acid liquors when treated with a mixture of calcium hydroxide and an electrolyte producing material having a high content of $CaCO_3$ possesses qualities which render the same particularly well adapted to the treatment of organic waste liquors having a substantial content of putrescible colloidal matter. The waste acid liquors from pickling vats of steel mills of course contain substantial quantities of $H_2SO_4$ and iron salts usually in the form of $FeSO_4$. When these acid liquors are treated with $Ca(OH)_2$ and $CaCO_3$ in substantially the proportions of 1 to 4 there is separated from the acid liquor a sludge having a high content of very finely precipitated calcium sulphate and it is this sludge which I propose to use as an electrolyte producing material in the treatment of organic waste liquors to remove the putrescible colloidal content therefrom.

It will be appreciated that when the $Ca(OH)_2$ is added to the acid waste the following reaction will occur:

$$Ca(OH)_2 + H_2SO_4 = CaSO_4 + 2H_2O$$

resulting in the precipitation of the $CaSO_4$. The addition of $CaCO_3$ to the acid waste also results in the production of precipitated $CaSO_4$ since $$CaCO_3 + H_2SO_4 = CaSO_4 + H_2CO_3.$$

Furthermore, some of the $Ca(OH)_2$ reacts with the $FeSO_4$ content of the acid waste as follows:

$$Ca(OH)_2 + FeSO_4 = CaSO_4 + Fe(OH)_2$$

yielding additional precipitated $CaSO_4$ which is found in the resultant sludge.

This sludge is characterized by the fact that it contains undissolved portions of the electrolyte producing material employed in the treatment of the acidified liquors, together with iron salts and calcium sulphate precipitated from the acid steel mill waste during the treatment thereof. As specifically illustrating the characteristics of this sludge, the following analysis of a sludge obtained by the treatment of steel mill acid waste with a reagent containing $Ca(OH)_2$ and an electrolyte producing material having a substantial content of $CaCO_3$ in the proportions of substantially 1 to 4 is given. It will be appreciated that the sludge will vary somewhat, depending upon the particular type of steel mill waste treated, and that no fixed analysis can be given. However, a sludge actually obtained showed upon analysis:—

| | Per cent. |
|---|---|
| Calcium carbonate | 41.15 |
| Calcium sulphate | 36.66 |
| Ferrous hydrate | 20.18 |
| Ferric hydrate | .86 |
| Ferrous sulphate | .32 |

The electrolyte producing qualities of this sludge are, to a considerable degree, due to the presence therein of precipitated $CaSO_4$. The extreme fineness of this precipitated $CaSO_4$ increases the rate of its solution in the organic waste treated thereby increasing the rate of adsorption of the positive ions by the negative colloids in the organic waste. It is to be noted that this sludge contains a substantial quantity of iron salts which function when the solution is employed in the treatment of an organic waste, as a coagulant to carry down the colloids when the charges thereof have been neutralized by the adsorption of the positive ions released from the electrolyte.

Since some organic wastes have a decided acid reaction, and since the charge of the colloids can be best neutralized when the waste has an alkaline reaction, it will be further found desirable to employ, in the treatment of the organic waste, a quantity of hydrated lime in addition to the sludge obtained from the treatment of steel mill waste in the manner hereinbefore described.

In some instances, it will be found that the iron salts present in the sludge obtained from the steel mill waste, are insufficient in quantity to supply the necessary coagulant for carrying down the suspended matter from the organic waste. In such cases, there may be advantageously incorporated with the sludge, hereinbefore discussed, a suitable quantity of ferrous sulphate.

At this point, it should be noted that the iron salts present in the sludge, separated from the steel mill waste readily take up oxygen. Accordingly these iron salts at the time of use in treating organic waste will represent iron which has been oxidized from the ferrous to the ferric state, and therefore these iron salts, when employed as a coagulant in the treatment of the organic waste, do not take up oxygen, with the result that the effluent produced in the purification of the organic waste contains a higher per cent of dissolved oxygen than would be the case if ferrous iron alone were employed to supply the coagulant.

With respect to the incorporation of the electrolyte in the organic waste, it is significant that while the positive ions of the electrolyte are adsorbed by the negatively charged colloids, the negative $SO_4$ or $CO_3$ ions of the electrolyte unite with the water of the solution, releasing nascent oxygen according to the following reactions:—

$$2SO_4 \text{ plus } 2H_2O = 2H_2SO_4 \text{ plus } 2O$$

and $$2CO_3 \text{ plus } 2H_2O = 2H_2CO_3 \text{ plus } 2O.$$

The resultant nascent oxygen functions to destroy bacteria and supply a dissolved oxygen content to the final effluent. As illustrative of the practice of the process, the following treatment of domestic sewage is given. The raw sewage treated showed upon analysis the following:—

| | | |
|---|---|---|
| Total solids | 1238 | P.P.M. |
| Total organic matter | 520 | P.P.M. |
| Total mineral matter | 718 | P.P.M. |
| Total suspended matter | 341 | P.P.M. |
| Total organic suspended matter | 180 | P.P.M. |
| Total mineral suspended matter | 161 | P.P.M. |
| Organic nitrogen | 28.0 | P.P.M. |
| Albuminoid nitrogen | 8.4 | P.P.M. |
| Ammonia nitrogen | 12.0 | P.P.M. |
| Nitrate nitrogen | 0.0 | P.P.M. |
| Nitrite nitrogen | .12 | P.P.M. |
| Dissolved oxygen | 0.0 | P.P.M. |
| 24 hour biochemical oxygen demand | 147.2 | |
| 48 hour biochemical oxygen demand | 195.6 | |
| 10 day biochemical oxygen demand | 350.2 | |
| Hydrogen ion concentration | 7.4 | |
| Total bacteria | 6,800,000 per C.C. | |
| B. coli | 860,000 per C.C. | |

This sewage was treated with a treating mixture comprising 67.8 parts of sludge obtained from the treating of steel mill waste, as above described; 25 parts of hydrated lime; and 7.2 parts of ferrous sulphate. The treating mixture is added to the polluted liquid and the liquid agitated to intimately incorporate the mixture in the liquid. The constituents of the mixture may be varied within comparatively wide limits, as for example, the quantity of the sludge in the mixture may vary from 60 to 75 parts, the hydrated lime from 25 to 35 parts, and the ferrous sulphate from 6 to 10 parts, or if the sludge is sufficiently rich in iron salts, no additional ferrous sulphate need be added. This treating mixture is used in an amount sufficient to give complete clarification of the sewage. The proper amount may be readily ascertained by noting the size of the floc, the rapidity of precipitation and the clarification of the liquid. It may be stated that for an organic waste of the character of domestic sewage, from 3 to 7 pounds of the mixture will be found adequate to treat 1000 gallons of the sewage. It will be appreciated that the more concentrated the organic waste, the greater the quantity of treating mixture necessary to effect purification thereof. Sewage conforming to the above analysis, when treated with 4 pounds of the above mixture per thousand gallons of sewage in the manner above set forth, yielded an effluent which showed upon analysis the following:—

| | | |
|---|---|---|
| Total solids | 760 | P.P.M. |
| Total organic matter | 102 | P.P.M. |
| Total mineral matter | 658 | P.P.M. |
| Total suspended matter | 5 | P.P.M. |
| Total organic suspended matter | 2 | P.P.M. |
| Total mineral suspended matter | 3 | P.P.M. |
| Organic nitrogen | 3.8 | P.P.M. |
| Albuminoid nitrogen | .7 | P.P.M. |
| Ammonia nitrogen | 11.9 | P.P.M. |
| Nitrate nitrogen | .2 | P.P.M. |
| Nitrite nitrogen | .15 | P.P.M. |
| Dissolved oxygen | 5.7 | P.P.M. |
| 24 hour biochemical oxygen demand | 4.1 | P.P.M. |
| 48 hour biochemical oxygen demand | 6.5 | P.P.M. |
| 10 day biochemical oxygen demand | 26.2 | P.P.M. |
| Hydrogen ion concentration | 8.7 | |
| Total bacteria | 13,900 per C.C. | |
| B. coli | 720 per C.C. | |

It will be appreciated that the foregoing treatment is merely illustrative of the operation of the process and that the process is adapted to the treatment of other organic wastes than sewage and that the treating mixture may be modified within relatively wide limits both as to the quantity of its various constituents and as to the total quantity employed. The sludge derived from steel mill or other acid waste will, however, in all instances constitute the predominating constituent of the treating mixture.

The foregoing specific description of the operation of the process is merely illustrative and is not to be regarded in a limited sense since I contemplate within the scope of my invention such modifications and changes as may be necessary to adapt the process to the particular local conditions existing at the plant where the process is to be employed.

Having thus described my invention, what I claim is:—

1. A mixture for purifying polluted liquids which contain organic matter in colloidal form, said mixture containing a substantial quantity of lime, ferrous sulphate, and a sludge, the sludge content of the mixture being characterized by its having been recovered by a purifying treatment of a waste liquor having a substantial acid content and a substantial content of iron salts, the sludge containing in excess of 15% each of calcium sulphate and calcium carbonate.

2. A mixture for purifying polluted liquids which contain organic matter in colloidal form, said mixture containing a substantial quantity of lime, ferrous sulphate, and a sludge, the sludge constituent of the mixture being present therein in a quantity in excess of the quantity of either of the other constituents in the mixture, and containing in excess of 15% each of calcium sulphate and calcium carbonate.

3. A process for treating polluted liquids containing putrescible matter in colloidal form, comprising incorporating therein $Ca(OH)_2$, sufficient to insure that the colloids in the liquid will carry a negative charge, and a substantial quantity of sludge derived from the treatment of waste acid liquors, said sludge containing in excess of 15% each of calcium carbonate, calcium sulphate and iron salts.

4. A process for purifying sewage comprising incorporating therein a treating mixture, containing calcium hydroxide, sludge derived from the treatment of waste acid liquors and an added coagulant, said sludge representing in excess of 50% of the treating mixture and containing at least 15% each of calcium carbonate and calcium sulphate.

5. A process for purifying sewage comprising incorporating therein a treating mixture containing calcium hydroxide, sludge derived from the treatment of waste acid liquors and an added coagulant, said sludge representing in excess of 50% of the treating mixture and containing at least 15% each of calcium carbonate and calcium sulphate, adding said treating mixture to the liquid in the proportions of from 3 to 7 pounds of treating mixture per 1000 gallons of sewage treated.

6. The process herein described for the purification of putrescible liquid containing organic matter in colloidal form, which comprises treating waste acid liquors from pickling vats of steel mills with $Ca(OH)_2$ and $CaCO_3$ to produce a sludge containing precipitating agents and then adding the sludge containing the precipitating agents thus produced to the sewage.

JOHN T. TRAVERS.